(12) United States Patent
Wermter et al.

(10) Patent No.: US 9,403,952 B2
(45) Date of Patent: Aug. 2, 2016

(54) DUROMER, PRODUCTION METHOD, USE AND COMPOSITIONS

(71) Applicant: Chemische Fabrik Budenheim KG, Budenheim (DE)

(72) Inventors: Hendrik Wermter, Eltville (DE); Thomas Futterer, Ingelheim (DE); Robert Vogt, Freiburg (DE); Manfred Doering, Wörth Am Rhein (DE); Michael Ciesielski, Merseburg (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

(21) Appl. No.: 14/766,274

(22) PCT Filed: Feb. 11, 2014

(86) PCT No.: PCT/EP2014/052633
§ 371 (c)(1),
(2) Date: Aug. 6, 2015

(87) PCT Pub. No.: WO2014/124933
PCT Pub. Date: Aug. 21, 2014

(65) Prior Publication Data
US 2015/0368405 A1 Dec. 24, 2015

(30) Foreign Application Priority Data
Feb. 14, 2013 (DE) .......... 10 2013 101 487

(51) Int. Cl.
*C08G 79/04* (2006.01)
*C09K 21/14* (2006.01)
*C08F 222/10* (2006.01)
*C08F 230/02* (2006.01)
*C08K 5/529* (2006.01)

(52) U.S. Cl.
CPC .............. *C08G 79/04* (2013.01); *C08F 222/10* (2013.01); *C08F 222/1006* (2013.01); *C08F 230/02* (2013.01); *C09K 21/14* (2013.01); *C08K 5/529* (2013.01)

(58) Field of Classification Search
CPC ........ C08G 79/04; C08F 222/10; C09K 21/14
See application file for complete search history.

(56) References Cited

U.S. PATENT DOCUMENTS

2010/0003604 A1   1/2010  Kang et al.
2010/0181696 A1   7/2010  Glauner et al.
2011/0257347 A1*  10/2011 Lin .................... C07F 9/657172
                                                              525/523
2012/0129414 A1*  5/2012  Chang ...................... C08K 3/22
                                                              442/175
2012/0130126 A1*  5/2012  Su ........................ C07F 9/65719
                                                              564/16
2012/0157589 A1*  6/2012  Roth .................. C08K 5/34928
                                                              524/101
2012/0157632 A1   6/2012  Taketani et al.
2012/0322923 A1   12/2012 Wermter et al.

FOREIGN PATENT DOCUMENTS

| CN | 102482500 | 5/2012 |
| CN | 102741335 | 10/2012 |
| DE | 10 2005 015 605 A1 | 10/2006 |
| DE | 10 2008 012 806 A1 | 9/2009 |
| DE | 10 2009 037 631 A1 | 2/2011 |
| DE | 10 2009 055 434 A1 | 7/2011 |
| JP | H07-78209 | 8/1995 |
| JP | 2742841 | 4/1998 |
| JP | 2009-544794 | 12/2009 |
| JP | 2011-514925 | 5/2011 |
| JP | 2011-225853 | 11/2011 |
| WO | WO 2008/013417 | * 1/2008 |
| WO | WO-2008/013417 A1 | 1/2008 |
| WO | WO-2008/151893 A1 | 12/2008 |
| WO | WO 2009/109347 | * 9/2009 |
| WO | WO-2009/109347 A1 | 9/2009 |
| WO | WO 2011/024806 | 3/2011 |
| WO | WO-2011/080306 A3 | 12/2011 |

OTHER PUBLICATIONS

English-language translation of an Office Action dated Jan. 6, 2016 issued in corresponding Korean patent application No. KR 10-2015-7024059 (6 pages).
English-language translation of an Office Action dated Mar. 3, 2016 issued in corresponding Chinese patent application No. 201480008668.9 (3 pages).
English-language translation of an Office Action dated Feb. 4, 2016 issued in corresponding Japanese patent application No. 2015-557401 (4 pages).

* cited by examiner

*Primary Examiner* — Robert Harlan
(74) *Attorney, Agent, or Firm* — Drinker Biddle & Reath LLP

(57) ABSTRACT

A duromer, a method for producing the duromer, a use of the duromer as well as a flame retardant containing the duromer and plastics compositions thereof are disclosed. A phosphorous-containing polymer which is based on multi-functional esters of unsaturated carboxylic acids is three-dimensionally cross-linked and forms the claimed duromer as described. The duromer is suitable as a flame retardant and suitable for use in flame retardants for plastics.

16 Claims, 1 Drawing Sheet

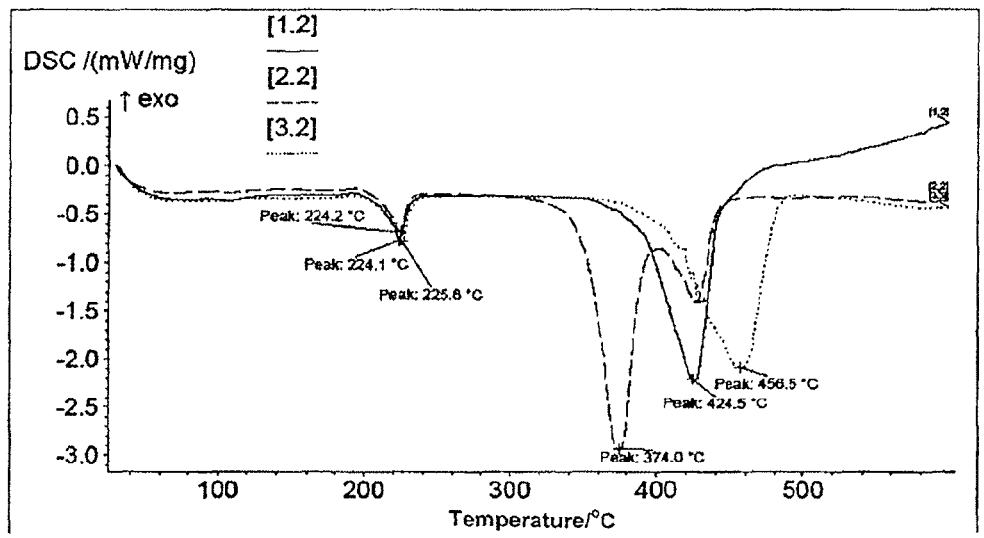
Fig 1: DSC measurements on the specimens [1.2] —, [2.2] ---, and [3.2] ··
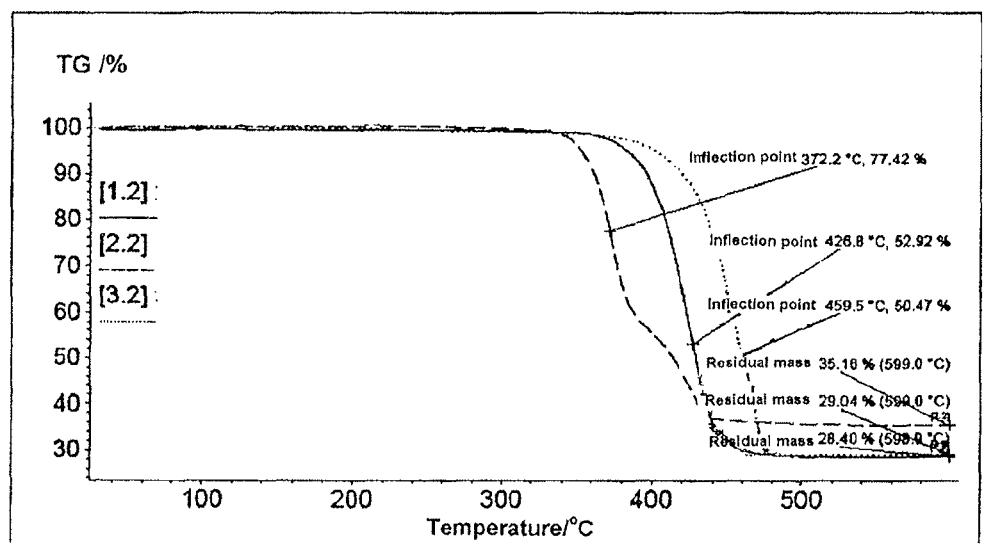
Fig 2: TGA measurements on the specimens [1.2] —, [2.2] ---, and [3.2] ··

DUROMER, PRODUCTION METHOD, USE AND COMPOSITIONS

CROSS REFERENCE TO RELATED APPLICATIONS

This application is a National Stage of International Application No. PCT/EP2014/052633 filed Feb. 11, 2014, which claims benefit of German Patent Application No. 10 2013 101 487.9 filed Feb. 14, 2013, both of which are herein incorporated by reference in their entirety.

SUBJECT-MATTER OF THE INVENTION

The invention concerns a duromer or thermoset, a method for the production of the thermoset, a use of the thermoset and thermoset-containing flame retardants and plastic compositions. A phosphorus-containing polymer based on multifunctional esters of unsaturated carboxylic acids which is three-dimensionally cross-linked and forms the claimed thermoset is described. The thermoset is suitable as a flame retardant and for use in flame retardants for plastics.

BACKGROUND OF THE INVENTION

For providing a flame retardant action for plastics, numerous substances are known which can be employed alone or in combination with further substances which afford similar or supplementary flame retardant properties. Preferably that involves using halogen-free substances to avoid the production and liberation of toxic substances. The known halogen-free flame retardants include those which are based on metal hydroxides, organic or inorganic phosphates, phosphinates or phosphonates with synergistically acting substances or derivatives of 1,3,5-triazine compounds and mixtures thereof.

Inter alia some monomeric, low-molecular flame retardant additives are known, which however because of their severe plasticiser effect in relation to plastics containing the flame retardant lead to significant worsenings of the material properties both in processing and also in use of the plastic. In addition, with such low-molecular flame retardant additives, because of their capability of migration in the plastic material after a certain period of time due to aggregation (less good distribution of the flame retardant additive) or leaching (migration to the surface and possibly issue from the plastic) their flame retardant action decreases.

Polymeric, high-molecular flame retardant additives in contrast generally have only slight plasticizer effects and a low migration capability. In contrast to low-molecular flame retardant additives however they are worse miscible in technical processing with the plastic to be protected, in particular by virtue of their worse melting capability and solubility in the plastic. WO 2009/109347 A1 for example discloses a straight-chain polyfunctional polymer which is obtained by Michael addition of DOPO to an itaconic acid and subsequent polycondensation with ethylene glycol. When that polymer is used in polyesters or polyamides they have a sticky and strongly adhering consistency under usual extrusion conditions of plastics (between 250 and 270° C.), whereby in particular in the loading region clogging and agglutination (blockage) of parts of the extrusion equipment is increasingly to be observed. In addition that polymer already breaks down from temperatures of about 300° C.

WO 2011/080306 discloses the use of such polymers of addition products of DOPO in connection with further flame-retardant components. It is assumed that improved processability of plastics occurs due to a use of smaller amounts of that polymer in conjunction with a further flame-retardant component which in that composition acts synergistically with the polymer. Therefore plastics which contain such synergistic mixtures can be processed in spite of the use of a polymer which is difficult to process, without clogging and metering in an extrusion process.

OBJECT

The object of the present invention is to provide in relation to the state of the art a substance which has flame-retardant properties and which is both thermally stable and readily processable and which upon being incorporated into a plastic polymer does not influence or only slightly influences the material properties thereof.

DESCRIPTION OF THE INVENTION

That object is attained by a thermoset which can be obtained by a method in which in a first step a compound or a mixture of compounds having the general formula I

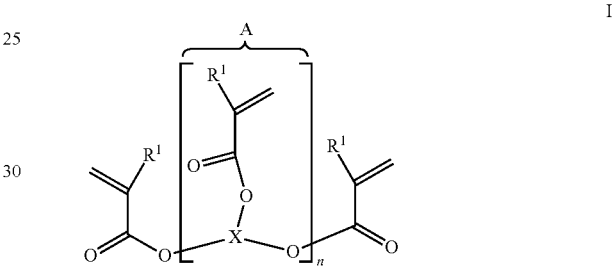

is reacted with a compound of the general formula II $$R^2\text{—H} \qquad \qquad \text{II}$$

giving a mixture of compounds of the general formula III

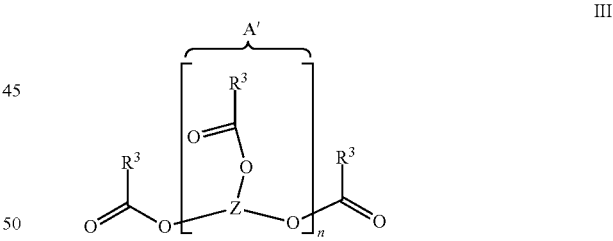

which in a second step is reacted in a radical polymerization operation to give a thermoset, wherein the designations are:
$R^1$ hydrogen, a $C_1$-$C_6$ alkyl, a $C_6$-$C_{12}$ aryl or a $C_6$-$C_{12}$ alkylaryl,

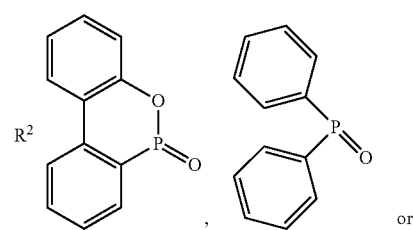

, or

-continued

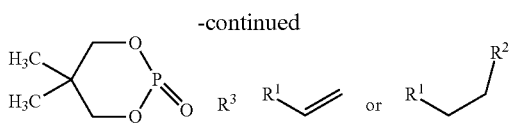

wherein within a compound of formula III and within the sub-unit A' the residues R³ can be the same or different and wherein the compound or the mixture of compounds of formula I is used in a ratio to the compound of formula II so that the ratio of

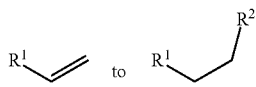

in the mixture produced in the first step of compounds III is in the range of between 4:1 and 1:4, and wherein

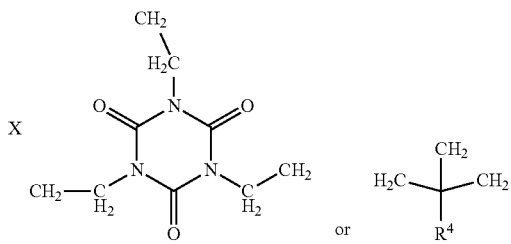

wherein $R^4$ is hydrogen, $CH_2OH$, OH, a $C_1$-$C_6$ alkyl, a $C_6$-$C_{12}$ aryl, a $C_6$-$C_{12}$ alkylaryl or

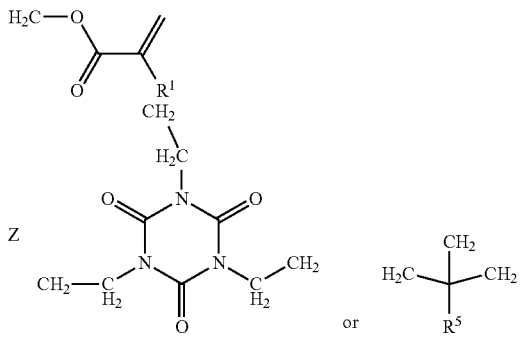

wherein $R^5$ is hydrogen, $CH_2OH$, OH, a $C_1$-$C_6$ alkyl, a $C_6$-$C_{12}$ aryl, a $C_6$-$C_{12}$ alkylaryl or

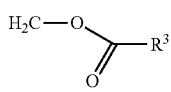

and n in the compound according to formula I or the mixtures of compounds according to formulae I and III represents a mean chain length in the range of between 1 and 100.

The thermoset is a three-dimensional cross-linked molecule which is insoluble in water (inter alia under normal conditions, that is to say 0° C. and 1.01325 bars). The thermoset is also insoluble in toluene under the above-indicated conditions and generally in organic solvents known to the man skilled in the art.

The thermoset obtained has a decomposition temperature of at least 350° C. In particular the decomposition temperature is in the range of between 350° C. and 550° C., preferably between 380° C. and 500° C. Such a thermoset is suitable in particular for incorporation in plastics upon extrusion as on the one hand it does not break down at processing temperatures which are usual for extrusion and it does not melt, while on the other hand it is broken down at higher temperatures occurring in fires and as a result deploys its flame-retardant action.

The term thermoset in accordance with this invention includes in that respect both a thermoset and also a mixture of thermosets.

The thermoset can be obtained by the above-described sequence of reaction steps in which in the first step an organophosphorus compound in accordance with formula II is linked in a phospha-Michael addition to multi-functional unsaturated esters in accordance with formula I. In that respect a deficiency of organophosphorus compound in accordance with formula I is used in comparison with the ester groups contained in the multi-functional unsaturated esters or peripheral C—C double bonds (α,β-unsaturated bonds). Due to the use of the organophosphorus compound in a state of deficiency there is not a complete reaction of the peripheral C—C double bonds so that the remaining C—C double bonds are reacted in the second stage by radical polymerization and that thereby results in cross-linked polymeric products.

In this context deficiency means that fewer organophosphorus compounds are used in the reaction than there are peripheral C—C double bonds in the multi-functional unsaturated ester or the mixture of esters in accordance with formula I, this involving a molar ratio.

The substances specified as a compound in accordance with formula II are 6H-dibenz[c,e][1,2]-oxaphosphorin-6-oxide (DOPO, CAS-No. 35948-25-5), diphenyl phosphine oxide (DPhPO, CAS-No. 4559-70-0), 5,5-dimethyl-1,2,3-dioxophosphorinane-2-oxide (DDPO, CAS-No. 4090-60-2).

The phospha-Michael addition in the first step and the radical polymerization in the second step take place under reaction conditions known to the man skilled in the art for the individual reactions. A check on the completeness of the progression with the phospha-Michael addition is preferably effected by NMR, wherein preferably the disappearance of the educts is monitored.

The production of the polymeric products is shown in the production of the thermoset by precipitation of the product out of the solution in which polymerization takes place. In that case the thermoset occurs in pure form and does not require further purification. It is only by virtue of storage that in particular solvents can be included, which however can be removed by a subsequent drying step. Such a drying step is preferably effected at temperatures in the range of between about 200° C. and 270°, preferably in vacuum in a range of between about 4 mbars and 8 mbars.

It has admittedly been found that the precipitated particles can absorb a certain amount of liquid, but the thermoset particles are not dissolved but only swell.

The thermoset can be introduced in the form of particles into plastics, in particular polyamides and polyesters, and in that respect experience only an immaterial change in their mechanical properties, scratch resistance and thermal dimensional stability. For that purpose the particles obtained in the method are ground to a desired size and/or a desired size is sorted out by known methods, like for example sieving, in which respect in particular average particle diameters d50 in a range of between 10 μm and 50 μm can be selected.

The detail in respect of the mean chain length n for the compound or the mixture of compounds of formula I and the mixture of compounds of formula III includes the point that mixtures of compound I are used, which in unit A can have different chain lengths n, wherein the detail in respect of the mean chain length n also denotes the number average of the various chain lengths n or the mean chain length n. That detail also includes the point that it is possible to use only one compound in accordance with formula I, whose chain length n is a whole number 1, 2, 3, 4 or more in a range of between 1 and 100. The mean chain length n remains unchanged in the course of the method so that the mean chain length in the mixture of compounds of formula III corresponds to the mean chain length of the compound of formula I or that of the mixture of compounds of formula I.

In an embodiment in the first step a mixture of compounds of general formula I is used, which have identical $R^1$ and/or identical X.

By virtue of the deficiency in respect of compounds of formula II in the first step different groups $R^3$ are obtained. For the situation where $R^3$ is

no reaction occurs.

With the implementation of phospha-Michael addition to the group

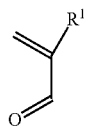

in a compound of formula I $R^3$ is

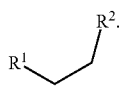

It will be appreciated that it is not possible to set out any statement in regard to the progress of the reaction at individual groups E in a compound of formula I. Both within a compound of formula III and also within the sub-unit A' of a compound of formula III, all, none or a part of the groups E can react in a first step so that the $R^3$ are the same or partly different from each other within a compound of formula III and within the sub-unit A'. The ratio of the groups obtained in the first step

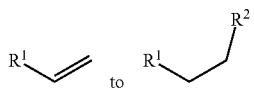

in the mixture of compounds of formula III is however overall in the range of between 4:1 and 1:4.

In a preferred embodiment the molar ratio of the compound of the general formula II to the compound or the mixture of compounds of the general formula I prior to the reaction in the first step is in the range of 1 to 5/E to 1 to 1.25/E, wherein E is the number of groups

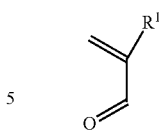

in the compound or the mixture of compounds according to formula I. If a mixture is used then E is the average number of groups.

Fixing the ratio of the reaction partners ensures that, upon complete implementation of the Michael addition on average in the range of between 10% and 80% of the C—C double bonds are retained, which then in the second step provide for radical polymerization, whereby a well cross-linked thermoset is obtained.

In a preferred embodiment n is in the range of between 1 and 50.

In an embodiment n represents a chain length in the range of between 1 and 25, in particular between 1 and 15, preferably between 1 and 10.

In a preferred embodiment compound I is selected from pentaerythritol tetra-acrylate, dipentaerythritol penta-acrylate, dipentaerythritol hexa-acrylate, trimethylolpropane tris-acrylate and tris(2-acryloxyethyl)isocyanurate (pentaerythritol tetra-acrylate PETA, CAS-No. 4986-89-4), dipentaerythritol penta-acrylate (DPPA, CAS-No. 60506-81-2), dipentaerythritol hexa-acrylate (CAS-No. 29570-58-9), trimethylolpropane tris-acrylate (TMPTA, CAS-No. 15625-89-5), tris(2-acryloxyethyl)isocyanurate (THEICTA, CAS-No. 40220-08-4). It has been found that they are particularly well suited for the preparation of a well cross-linked thermoset.

In a preferred embodiment the reaction in the first step is effected under catalysis with a catalyst selected from tertiary amines and tertiary amino-bases. The catalyst is preferably triethylamine. It has been found that such a catalyst is advantageous for complete implementation of the Michael addition in the first step and at the same time does not have any disturbing effects in the subsequent radical polymerization operation.

In a preferred embodiment the reaction in the second step takes place in an emulsion in toluene or water. In the second reaction step the thermoset according to the invention occurs directly in pure form and precipitates out of those solvents. Therefore only a drying operation is required, but no further purification of the thermoset is necessitated.

Preferably the radical polymerization operation in the second step takes place in a protective gas atmosphere, preferably a nitrogen atmosphere.

In a preferred embodiment the reaction in the second step is effected by means of a radical starter preferably selected from azo-bis-(isobutyronitrile) (AIBN) and dibenzoyl peroxide. Preferably the reaction is effected using azo-bis-(isobutyronitrile).

According to the invention there is also provided a method for the production of the thermoset according to the invention, in which in a first step a compound or a mixture of compounds having the general formula I

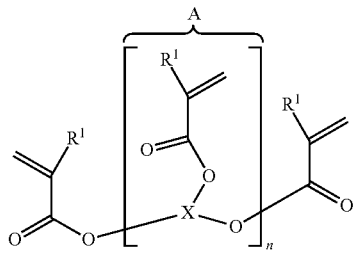

is reacted with a compound of the general formula II $R^2$—H      II giving a mixture of compounds of the general formula III

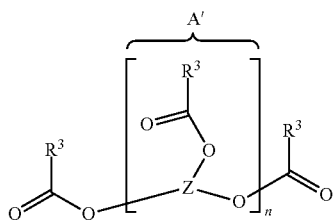

which in a second step is reacted in a radical polymerization operation to give a thermoset, wherein the designations are:

$R^1$ hydrogen, a $C_1$-$C_6$ alkyl, a $C_6$-$C_{12}$ aryl or a $C_6$-$C_{12}$ alkylaryl,

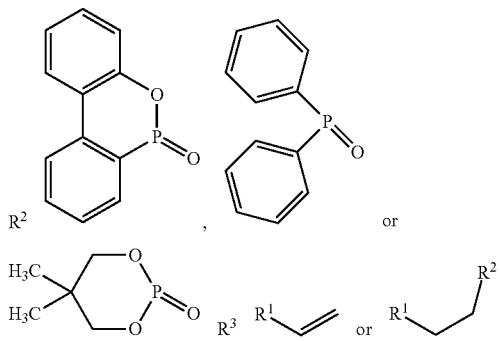

wherein within a compound of formula III and within the sub-unit A' the residues $R^3$ can be the same or different and wherein the compound or the mixture of compounds of formula I is used in a ratio to the compound of formula II so that the ratio of

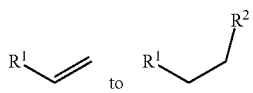

in the mixture produced in the first step of compounds III is in the range of between 4:1 and 1:4, and wherein

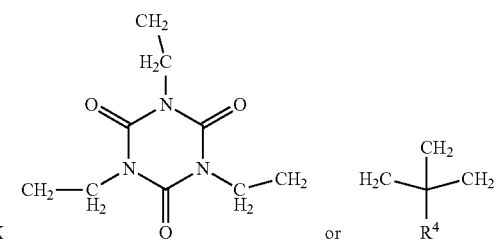

wherein $R^4$ is hydrogen, $CH_2OH$, OH, a $C_1$-$C_6$ alkyl, a $C_6$-$C_{12}$ aryl, a $C_6$-$C_{12}$ alkylaryl or

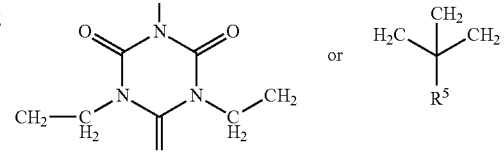

wherein $R^5$ is hydrogen, $CH_2OH$, OH, a $C_1$-$C_6$ alkyl, a $C_6$-$C_{12}$ aryl, a $C_6$-$C_{12}$ alkylaryl or

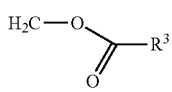

and n in the compound according to formula I or the mixtures of compounds according to formulae I and III represents a mean chain length in the range of between 1 and 100.

The above-described sequence of reaction steps in which in a first step an organophosphorus compound according to formula II is linked in a phospa-Michael addition to multi-functional unsaturated esters according to formula I provides for the production of a thermoset or a mixture of thermosets. In that respect a deficiency of organophosphorus compound in accordance with formula II is used in comparison with the ester groups contained in the multi-functional unsaturated esters or peripheral C—C double bonds (α,β-unsaturated bonds). The use of the organophosphorus compound in a state of deficiency means that a complete reaction of the peripheral C—C double bonds does not occur so that the remaining C—C double bonds are reacted in the second stage by radical polymerization and cross-linked polymeric products are produced as a result.

Deficiency means in this context that fewer organophosphorus compounds are used in the reaction than there are peripheral C—C double bonds in the multi-functional unsaturated ester or the mixture of esters in accordance with formula I, this involving a molar ratio.

The substances specified as a compound in accordance with formula II are 6H-dibenz[c,e][1,2]-oxaphosphorin-6-oxide (DOPO, CAS-No. 35948-25-5), diphenyl phosphine oxide (DPhPO, CAS-No. 4559-70-0), 5,5-dimethyl-1,2,3-dioxaphosphorinane-2-oxide (DDPO, CAS-No. 4090-60-2).

The phospha-Michael addition in the first step and the radical polymerization in the second step take place under reaction conditions known to the man skilled in the art for the individual reactions. A check on the completeness of the progression with the phospha-Michael addition is preferably effected by NMR, wherein preferably the disappearance of the educts is monitored.

The production of the polymeric products is shown in the production of the thermoset by precipitation of the product out of the solution in which polymerization takes place. In that case the thermoset occurs in pure form and does not require further purification. It is only by virtue of storage that in particular solvents can be included, which however can be removed by a subsequent drying step. Such a drying step is preferably effected at temperatures in the range of between about 200° C. and 270°, preferably in vacuum in a range of between about 4 mbars and 8 mbars.

The particles obtained in the method can be ground in a further step to a desired size and/or a desired size can be sorted out by known processes like for example sieving, wherein in particular it is possible to select average particle diameters d50 in a range of between 10 μm and 50 μm.

The detail in respect of the mean chain length n for the compound or the mixture of compounds of formula I and the mixture of compounds of formula III includes the point that mixtures of compound I are used, which in unit A can have different chain lengths n, wherein the detail in respect of the mean chain length n also denotes the number average of the various chain lengths n or the mean chain length n. That detail also includes the point that it is possible to use only one compound in accordance with formula I, whose chain length n is a whole number 1, 2, 3, 4 or more in a range of between 1 and 100. The mean chain length n remains unchanged in the course of the method so that the mean chain length in the mixture of compounds of formula III corresponds to the mean chain length of the compound of formula I or that of the mixture of compounds of formula I.

In an embodiment in the first step a mixture of compounds of general formula I is used, which have identical $R^1$ and/or identical X.

In a preferred embodiment of the method the molar ratio of the compound of the general formula II to the compound or the mixture of compounds of the general formula I prior to the reaction in the first step is in the range of 1 to 5/E to 1 to 1.25/E, wherein E is the number of groups

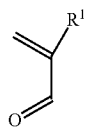

in the compound or the mixture of compounds according to formula I.

In a preferred embodiment n is in the range of between 1 and 50.

In an embodiment n represents a chain length in the range of between 1 and 25, in particular between 1 and 15, preferably between 1 and 10.

In a preferred embodiment the method uses a compound I selected from pentaerythritol tetra-acrylate, dipentaerythritol penta-acrylate, dipentaerythritol hexa-acrylate, trimethylolpropane tris-acrylate and tris(2-acryloxyethyl)isocyanurate.

In a preferred embodiment of the method the reaction in the first step is effected under catalysis with a catalyst selected from tertiary amines and tertiary amino-bases, preferably triethylamine.

In a preferred embodiment the reaction in the second step of the method takes place in an emulsion in toluene or water.

Preferably the radical polymerization operation in the second step takes place in a protective gas atmosphere, preferably a nitrogen atmosphere.

In a preferred embodiment the reaction in the second step is effected by means of a radical starter preferably selected from azo-bis-(isobutyronitrile) and dibenzoyl peroxide.

According to the invention there is further provided a flame retardant composition containing a thermoset as set forth in one of claims 1 through 7. It has been found that the thermoset can advantageously be used as or in a flame retardant in particular for plastic compositions.

The thermoset deploys its flame-retardant action in the gaseous phase. It can be used in combination with other flame retardants, for example with those which by virtue of their decomposition give off oxygen into the environment of the plastic material protected in that way and/or which by virtue of their decomposition at high temperatures result in layer formation on the surface of the plastic material provided with the flame retardant. That possibly prevents the plastic material from continuing to burn. In addition it is also possible to use the thermoset with flame retardants which function on the basis of another operative mechanism.

In a preferred embodiment the flame retardant composition contains at least one further flame-retardant component which is preferably selected from nitrogen bases, melamine derivatives, phosphates, pyrophosphates, polyphosphates, organic and inorganic phosphinates, organic and inorganic phosphonates and derivatives of the afore-mentioned compounds, preferably selected from ammonium polyphosphate, ammonium polyphosphate particles coated and/or coated and cross-linked with melamine, melamine resin, melamine derivatives, silanes, siloxanes or polystyrenes, as well as 1,3, 5-triazine compounds including melamine, melam, melem, melon, ammeline, ammelide, 2-ureidomelamine, acetoguanamine, benzoguanamine, diamino phenyl triazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-triazine compounds, guanine, piperazine phosphate, piperazine polyphosphate, ethylene diamine phosphate, pentaerythritol, borophosphate, 1,3,5-trihydroxyethyl isocyanurate, 1,3,5-triglycidyl isocyanurate, triallyl isocyanurate and derivatives of the afore-mentioned compounds.

It has been found that the thermoset not only on its own has flame-retardant properties but also has excellent flame-retardant properties in combination with other flame-retardant substances in a flame retardant composition.

Preferably besides the thermoset according to the invention the flame retardant composition contains melamine polyphosphate as a further flame retardant component.

In a preferred embodiment the ratio of thermoset to the at least one further flame retardant component in the flame retardant composition is between 1:99 and 99:1, preferably between 1:99 and 1:1 and particularly preferably between 1:99 and 1:9.

Those ratios also apply to the use of melamine polyphosphate as a further flame retardant component.

The invention further provides the use of the thermoset as a flame retardant or in a flame retardant composition in the production of plastic compositions.

It has been found that thermosets according to the invention have excellent properties in particular in the production of plastic compositions using an extrusion process and without influencing the processing properties of the plastics, in which processes different plastics can be processed. When using the thermoset in plastics the glass transition temperature of the plastics is only slightly altered.

Plastics in which the thermoset can be used as a flame retardant or in a flame retardant composition are selected from filled and unfilled polyolefins, vinyl polymers, olefin copolymers, thermoplastic elastomers on an olefin basis, cross-linked thermoplastic elastomers on an olefin basis, polyurethanes, filled and unfilled polyesters and copolyesters, styrene block copolymers, filled and unfilled polyamides and copolyamides. Examples of copolyesters are PET and PBT.

In principle the thermoset and the thermoset-containing flame retardant compositions can be used for all desired plastics. They can be used as flame retardation for unfilled and filled or reinforced polyamides, polyesters like polybutylene terephthalate and polyethylene terephthalate, polyolefins like polyethylene and polypropylene, polystyrene, styrene block copolymers like ABS, SBS, SEES, SEPS, SEEPS and MBS, polyurethanes, polyacrylates, polycarbonates, polysulfones, polyetherketone, polyphenylene oxide, polyphenylene sulfide, epoxy resins and so forth.

In a preferred embodiment the plastic compositions are selected from filled and unfilled polyamides, polyesters and polyolefins. The term a filled plastic composition is used in that respect to denote a plastic composition containing one or more fillers, in particular those selected from the group consisting of metal hydroxides, in particular alkaline earth metal hydroxides, alkali metal hydroxides and aluminum hydroxides, silicates, in particular sheet silicates, bentonite, alkaline earth metal silicates and alkali metal silicates, carbonates, in particular calcium carbonate as well as tallow, clay, mica, silica, calcium sulfate, barium sulfate, aluminum hydroxide, magnesium hydroxide, glass fibers, glass particles and glass balls, wood dust, cellulose powder, carbon black, graphite, boehmite and dye stuffs.

All the stated fillers can be present both in the usual shape and size for fillers, which is known to the man skilled in the art, and also in nano-scale form, that is to say in the form of particles of an average diameter in the range of between about 1 and about 100 nm, and can be used in the plastic compositions.

Preferably glass fibers are added as the filler to reinforce the plastic composition and increase its mechanical stability.

In a preferred embodiment the thermoset is introduced in an amount of between 1 and 30% by weight, preferably between 1 and 15% by weight, with respect to the total weight of the plastic composition with thermoset.

Those quantitative ratios provide for a good flame retardant action on the part of the thermoset and at the same time prevent a change in the properties of the plastic both upon processing and also those of the finished material, in particular in regard to mechanical properties, scratch resistance and thermal dimensional stability.

In a preferred embodiment the thermoset is introduced in a flame retardant composition with further flame retardant components into the plastic composition, wherein preferably the flame retardant composition is contained in the plastic composition in an amount of between 5 and 60% by weight, particularly preferably between 10 and 50% by weight, with respect to the total weight of the plastic composition with flame retardant composition.

With those quantitative ratios, on the one hand a good flame retardant action on the part of the flame retardant composition is guaranteed while on the other hand the processing and material properties of the thermoset are only slightly influenced.

The invention also provides a plastic composition containing the thermoset according to the invention.

It has been found that in particular filled and unfilled polyamides, polyesters and polyolefins which contain a thermoset according to the invention, without a change in the mechanical properties and processing properties can be processed in various methods for various uses. In particular the thermoset does not influence the behaviour of filled and unfilled polyamides, polyesters and polyolefins upon extrusion.

Plastics in which the thermoset can be used as a flame retardant or in a flame retardant composition are selected from filled and unfilled polyolefins, vinyl polymers, olefin copolymers, thermoplastic elastomers on an olefin basis, cross-linked thermoplastic elastomers on an olefin basis, polyurethanes, filled and unfilled polyesters and copolyesters, styrene block copolymers, filled and unfilled polyamides and copolyamides. Examples of copolyesters are PET and PBT.

In principle the thermoset can be used for any desired plastics, inter alia in unfilled and filled or reinforced polyamides, polyesters like polybutylene terephthalate and polyethylene terephthalate, polyolefins like polyethylene and polypropylene, polystyrene, styrene block copolymers like ABS, SBS, SEES, SEPS, SEEPS and MBS, polyurethanes, polyacrylates, polycarbonates, polysulfones, polyetherketone, polyphenylene oxide, polyphenylene sulfide and epoxy resins.

The thermoset deploys its flame-retardant action in the gaseous phase. It can be used in combination with other flame retardants, for example with those which by virtue of their decomposition give off oxygen into the environment of the plastic material protected in that way and/or which by virtue of their decomposition at high temperatures result in layer formation on the surface of the plastic material provided with the flame retardant. That possibly prevents the plastic material from continuing to burn. In addition it is also possible to use the thermoset with flame retardants which function on the basis of another operative mechanism The flame retardants which can be contained together with the thermoset in a plastic composition include flame-retardant components which are preferably selected from nitrogen bases, melamine derivatives, phosphates, pyrophosphates, polyphosphates, organic and inorganic phosphinates, organic and inorganic phosphonates and derivatives of the afore-mentioned compounds, preferably selected from ammonium polyphosphate, ammonium polyphosphate particles coated and/or coated and cross-linked with melamine, melamine resin, melamine derivatives, silanes, siloxanes or polystyrenes, as well as 1,3,5-triazine compounds including melamine, melam, melem, melon, ammeline, ammelide, 2-ureidomelamine, acetoguanamine, benzoguanamine, diamino phenyl triazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-triazine compounds, guanine, piperazine phosphate, piperazine polyphosphate, ethylene diamine phosphate, pentaerythritol, borophosphate, 1,3,5-trihydroxyethyl isocyanurate, 1,3,5-triglycidyl isocyanurate, triallyl isocyanurate and derivatives of the afore-mentioned compounds.

Besides the thermoset and optionally further flame-retardant components in an embodiment the plastic composition can also contain fillers, in particular those selected from the group consisting of metal hydroxides, in particular alkaline earth metal hydroxides, alkali metal hydroxides and aluminum hydroxides, silicates, in particular sheet silicates, bentonite, alkaline earth metal silicates and alkali metal silicates, carbonates, in particular calcium carbonate as well as tallow, clay, mica, silica, calcium sulfate, barium sulfate, aluminum hydroxide, magnesium hydroxide, glass fibers, glass particles and glass balls, wood dust, cellulose powder, carbon black, graphite, boehmite and dye stuffs.

All the stated fillers can be present both in the usual shape and size for fillers, which is known to the man skilled in the art, and also in nano-scale form, that is to say in the form of particles of an average diameter in the range of between about 1 and about 100 nm, and can be used in the plastic compositions.

Preferably glass fibers are added as the filler to reinforce the plastic composition and increase its mechanical stability.

FIG. 1 is a graph illustrating dynamic scanning calorimetry (DSC) measurements on particular specimens. FIG. 2 is a graph illustrating thermal gravimetric analysis (TGA) measurements on particular specimens.

EXAMPLES

Example 1

Thermoset of pentaerythritol tetra-acrylate (PETA) and 6H-dibenz[c,e][1,2]-oxaphosphorin-6-oxide (DOPO)

Method A: Emulsion Polymerization in Toluene 17.62 g (0.05 mol) of pentaerythritol tetra-acrylate and 21.62 g (0.1 mol) of DOPO were put in 150 ml of toluene, mixed with 10.12 g (0.1 mol, 13.9 ml) of triethylamine and heated for 4 hours without protective gas at 80° C. until complete implementation of the Michael addition (a check on the disappearance of the educts was effected by $^{31}$P and $^{1}$H-NMR analysis). The mixture was heated under a protective gas (feed of 100% $N_2$), with reflux and very intensive agitation for 30 hours at 125° C. The product was sucked away, finely ground after drying in air and completely dried for 6 hours at 225° C. in a vacuum (6 mbars). A white solid was obtained with a yield of 31.65 g (81%) and the following properties:

glass transition temperature (DSC): 98.0° C.;
elementary analysis: calculated n*$C_{41}H_{38}O_{12}P_2$: C, 62.76%; H, 4.88%; P, 7.89%. found: C, 62.21%; H, 5.37%; P, 7.75%.

Method B: Polymerization in Toluene in the Presence of a Radical Starter 105.7 g (0.3 mol) of pentaerythritol tetra-acrylate and 129.7 g (0.6 mol) of DOPO were put in 700 ml of toluene, mixed with 60.7 g (0.6 mol) of triethylamine and heated for 5 hours without protective gas at 80° C. until complete implementation of the Michael addition (a check on the disappearance of the educts was effected by $^{31}$P and $^{1}$H-NMR analysis). The supernatant phase was separated off by decanting. The volatile constituents were separated off on a rotational evaporator and the oily residue was then combined with the lower phase. 600 ml of toluene was then added. Then, heating was effected in a nitrogen atmosphere (feed of 100% $N_2$). After the boiling point was reached a solution of 0.1 g of azo-bis-(isobutyronitrile) (AIBN) in 10 ml of toluene was added dropwise with vigorous agitation in the course of 15 minutes. After a short time a suspension of particles of a thermoset was produced. That suspension was agitated under reflux for 2 hours. The product while still warm was sucked off, washed with toluene (150 ml), dried overnight in a fume cabinet and finally heated in a vacuum drying cabinet at 210° C. (3 hours, about 6 mbars). 223.6 g of product was obtained in the form of a white powder (yield 95%).

Method C: Emulsion polymerization in water 129.80 g (0.60 mol) of DOPO and 105.70 g (0.30 mol) of pentaerythritol tetra-acrylate (PETA) was put in 500 ml of toluene, mixed with 61.14 g (0.6 mol, 83.8 ml) of triethylamine and heated for 6 hours without protective gas at 80° C. until complete implementation of the Michael addition (a check on the disappearance of the educts was effected by $^{31}$P and $^{1}$H-NMR analysis). After cooling the liquid phase was decanted off and the residue was put into 500 ml of distilled water, mixed with 10.0 g of sodium dodecylsulfate and heated overnight with vigorous agitation at 85° C. The mixture was sucked away hot, the raw product was pre-dried at 140° C. in a vacuum, finely ground after cooling and completely dried for 6 hours at 250° C. in a vacuum (6 mbars). A beige-colored solid was obtained in a yield 184.24 g (78.23%).

Method D: Polymerization in Substance

For polymerization in substance a specimen of the decanted intermediate product was hardened in an open aluminum dish with an about 3 mm layer height in a drying cabinet for 6 hours at 150° C. The product obtained in that way was ground to give yellowish powder.

Example 2

Thermoset of Pentaerythritol Tetra-Acrylate and Diphenyl Phosphinoxide (DPhPO)

Emulsion Polymerization in Toluene 17.6 g (0.05 mol) of pentaerythritol tetra-acrylate and 20.2 g (0.1 mol) of DPhPO were put in 150 ml of toluene, mixed with 10.1 g (0.1 mol, 13.9 ml) of triethylamine and heated for 4 hours without protective gas at 80° C. until complete implementation of the Michael addition (a check was effected by NMR analysis). The mixture was heated under a protective gas (feed of 100% $N_2$), with reflux and very intensive agitation for 30 hours at 125° C. The product was sucked away, finely ground after drying in air and completely dried for 6 hours at 210° C. in a vacuum (6 mbars). A white solid was obtained with a yield of 85%.

Example 3

Thermoset of tris(2-acryloxyethyl)isocyanurate (THEICTA) and 6H-dibenz[c,e][1,2]-oxophosphorin-6-oxide (DOPO)

Emulsion Polymerization in Toluene 42.3 g (0.1 mol) of THEICTA and 21.62 g (0.1 mol) of DOPO were put in 150 ml of toluene, mixed with 10.1 g (0.1 mol, 13.9 ml) of triethylamine and heated for 4 hours without protective gas at 80° C. until complete implementation of the Michael addition (a check on the disappearance of the educts was effected by $^{31}$P and $^{1}$H-NMR analysis). The mixture was heated under a protective gas, with reflux and vigorous agitation for 30 hours at 125° C. The product was sucked away, finely ground after drying in air and completely dried for 6 hours at 200° C. in a vacuum (6 mbars). A white solid was obtained with a yield 87%.

Example 4

Thermoset of pentaerythritol tetra-acrylate and dimethyl-1,2,3-dioxophosphorinane-2-oxide (DDPO)

Emulsion Polymerization in Toluene 17.6 g (0.05 mol) of pentaerythritol tetraacrylate and 15.0 g (0.1 mol) of DDPO were put in 150 ml of toluene, mixed with 10.1 g (0.1 mol, 13.9 ml) of triethylamine and heated for 4 hours without protective gas at 80° C. until complete implementation of the Michael addition (a check on the disappearance of the educts was effected by $^{31}$P and $^1$H-NMR analysis). The mixture was heated under a protective gas (feed of 100% $N_2$), with reflux and very intensive agitation for 30 hours at 125° C. The product was sucked away, finely ground after drying in air and completely dried for 6 hours at 170° C. in a vacuum (6 mbars).

A white solid was obtained with a yield of 75%.

Example 5

Thermoset of Trimethylolpropane Tris-Acrylate (TMPTA) and DOPO Emulsion Polymerization in Toluene 29.6 g (0.1 mol) of TMPTA and 21.6 g (0.1 mol) of DDPO were put in 150 ml of toluene, mixed with 10.1 g (0.1 mol, 13.9 ml) of triethylamine and heated for 4 hours without protective gas at 80° C. until complete implementation of the Michael addition (a check on the disappearance of the educts was effected by $^{31}$P and $^1$H-NMR analysis). The mixture was heated under a protective gas (feed of 100% $N_2$), with reflux and vigorous agitation for 30 hours at 125° C. The product was sucked away, finely ground after drying in air and completely dried for 6 hours at 200° C. in a vacuum (6 mbars).

A white solid was obtained with a yield of 88%.

Example 6

Thermoset of Dipentaerythritol Hexa-Acrylate and DOPO

Polymerization in Toluene in the Presence of a Radical Starter 98.1 g (0.18 mol) of dipentaerythritol hexaacrylate (CAS-No: 29570-58-9) and 136.2 g (0.63 mol) of DOPO were put in 500 ml of toluene, mixed with 63.7 g (0.63 mol) of triethylamine and heated for 6 hours without protective gas at between 80 and 82° C. until complete implementation of the Michael addition (a check on the disappearance of the educts was effected by $^{31}$P and $^1$H analysis). The supernatant phase was then separated off by decanting. The volatile constituents were separated off on a rotational evaporator and the oily residue was then combined with the lower phase. 500 ml of toluene was then added. Then, heating was effected in a nitrogen atmosphere (feed of 100% $N_2$). After the boiling point was reached a solution of 0.15 g of azo-bis-(isobutyronitrile) (AIBN) in 50 ml of toluene was added dropwise with vigorous agitation in the course of 15 minutes. The suspension obtained of thermoset particles was agitated under reflux for 2 hours. The product while still warm was sucked off, washed with toluene (150 ml), dried overnight in a fume cabinet and heated in a vacuum drying cabinet at 210° C. (3 hours, about 6 mbars). The product was then ground with an analysis mill and then sieved (mesh size of the sieve: 0.5 mm). 226.6 g of the thermoset was obtained in the form of a white powder (yield 96.4%).

Example 7

DSC and TGA Investigations of the Flame Retardant in Plastic Compositions

To check the processing properties of plastic compositions containing the thermoset according to the invention different plastic compositions were produced with the thermoset according to the invention and known flame retardants and subjected to DSC (dynamic scanning calorimetry) and TGA (thermal gravimetric analysis) measurements.

Production of the Specimen Materials:

This investigation was conducted using a glass fiber-filled homopolymeric polyamide PA6.6 (poly-(N,N'-hexamethylene adipine diamide); BKV 30H1.0 from Lanxess), which was firstly extruded using a co-rotating double-shaft extruder with a screw diameter of 18 mm (L/D=40) from Coperion. The polyamide and the flame retardant were gravimetrically meterd. The extrusion output of the extruder was 3-5 kg/h, the processing temperature was 280° C. After the extrusion operation was concluded the finished polymer material was granulated using a water bath and a strand granulator (Pell-Tec).

Specimen Compositions

The tests were conducted with the extrusion of a PA6.6 polyamide (poly-(N,N'-hexamethylene adipine diamide), that is to say a homopolymer of hexamethylene diamine and adipic acid with 30% glass fibers with

[1.2] Poly-[DOPAc-2-PETA]: thermoset of pentaerythritol tetra-acrylate and DOPO, which was obtained in one of the tests in Example 1,

[2.2] melamine polyphosphate (Budit 3141 from Chemische Fabrik Budenheim), and

[3.2] no further additive.

The proportion of the respective additives was 22.5% of melamine polyphosphate [2.2] and 1% of thermoset [1.2] respectively, measured on the total specimen. No additive was added to the specimen [3.2].

Implementation of the DSC Measurement

The melting temperatures were determined by means of DSC measurements. The specimens to be investigated were heated from a starting temperature of 30° C. at a heating rate of 10 K/min to 600° C. The results of the measurements are shown in FIG. 1. The melting temperatures were graphically determined from the measurement date. The first change in the enthalpy curve gives the melting point of the polyamide with or without additive.

TABLE 1

| Melting temperatures ascertained from FIG. 1 | | | |
| --- | --- | --- | --- |
| Specimen | 1.2 | 2.2 | 3.2 |
| Melting temperature in ° C. | 224.1 | 225.6 | 224.2 |

The melting temperature of the polyamide with a glass fiber content of 30% is not changed by the addition of the thermoset poly-[DOPAc-2-PETA], therefore the same process parameters can be used in the production process as in the case of the polyamide without flame retardant.

Implementing the TGA Measurements

The operation of determining the decomposition temperature was carried out by means of TGA measurements under inert gas (nitrogen). The change in mass in dependence on temperature was measured at a heating rate of 10 K/min. The results of the measurements are shown in FIG. 2. The decomposition temperatures were graphically determined at the inflection point of the measurement curve.

It can be seen by means of the inflection points of the TGA curves that the thermal stability of the specimen with the thermoset poly-[DOPAc-2-PETA] is higher than in the case of the specimen of the polymer with melamine polyphosphate. For processing, this signifies that it is possible to operate in a much larger temperature window and that the flame retardant decomposes only at higher temperatures in the extruder.

Example 8

Ascertaining Flame Retardant Properties of the Thermoset

For these tests, test bodies of polymer materials with different flame retardant additives were produced. Both uses according to the invention and uses which are not according to the invention of flame retardants and corresponding polymer materials are implemented here.
Production Extrusion of the polymers was carried out on a co-rotating double-screw extruder with a screw diameter of 18 mm (L/D=40) from Coperion. Metering of the polymer and additive metering of the flame retardant were effected gravimetrically. The extruder was operated with an extrusion output of 3-5 kg/h. The issuing polymer melt was cooled down in a water bath prior to granulation with the strand granulator (Pell-Tec). The resulting granular material was processed by means of a mini-injection molding machine from Babyplast to give UL94 test bodies of a thickness of 1.6 mm.
Compositions/Combination The UL94 test was carried out on approved test bodies for testing the flame retardation properties and for classifying the flame retardant compositions according to the invention in different polymers. The flame retardants or compositions and the polymers used are set out hereinafter.
Polymer To produce the flame-retardant plastic compositions a PA6.6 (ALTECH A2015/109 from ALBIS) filled with 15% glass fibers was used. The base polymer was not equipped with a flame retardant either prior to processing in the test or by the manufacturer.

The details set out in Table 1 are proportions by weight of the respective component in the composition. The following flame-retardant components were used: a thermoset according to the invention poly-[DOPAc-2-PETA] (see above, hereinafter also referred to as poly-DOPAc) and Budit 3141 (melamine polyphosphate from Chemische Fabrik Budenheim), Ukanol FR 80 (polyester with 9,10-dihydro-9-oxa-10-phospha-phenanthrene-10-oxide-side chains from Schill+Seilacher).
UL94 Test A total of five specimen bodies, each of the plastic composition, was gripped in a vertical position and held to the free end of a Bunsen burner flame. The exact manner of conducting the tests and flame treatment with a 2 cm high Bunsen burner flame was in accordance with the requirements laid down by the Underwriters Laboratories, Standard UL94.

The classifications in the fire protection classifications V-0 to V-2 are specified as the result. In that respect V-0 means that the total burning time of 5 tested test bodies was less than 50 seconds and the cotton was not ignited by dripping glowing or burning pieces of the test body. Classification V-1 signifies that the total burning time was more than 50 seconds but less than 250 seconds and the cotton was also not ignited. V-2 signifies that the total burning time of 5 test bodies was admittedly less than 250 seconds, but the cotton was ignited by dripping test body pieces in at least one of the 5 tests. The abbreviation NC stands for "non-classifiable" and signifies that a total burning time of more than 250 seconds was measured. In many of those cases the test body burns completely.

The Table hereinafter specifies both the compositions and also the results of the flame retardation test described above:

| Test No. | Polymer PA6.6 15% GF | Flame retardation | | | UL94 1.6 mm |
|---|---|---|---|---|---|
| | | Poly-DOPAc | Budit 3141 | Ukanol FR80 | |
| Ref. 1 | 100 | | | | N.C |
| Ref. 2 | 77.5 | | 22.5 | | V-2 |
| Ref 3 | 75 | | 25 | | V-1 |
| Ref. 4 | 77.5 | | | 22.5 | V-2 |
| Ref. 5 | 80 | | | 20 | V-2 |
| Ref. 6 | 77.5 | | 7.5 | 15 | V-2 |
| Ref. 7 | 77.5 | | 12.5 | 10 | V-2 |
| Ref. 8 | 77.5 | | 15 | 7.5 | V-2 |
| Ex. 1 | 77.5 | 0.5 | 22 | | V-0 |
| Ex. 2 | 77.5 | 3 | 19.5 | | V-0 |
| Ex. 3 | 77.5 | 1 | 21.5 | | V-0 |

The results of the UL94 test show that a combination of Budit 3141 (MPP) and poly-[DOPAc-2-PETA] has a markedly better flame retardation action in the composition with polyamide PA6.6 15% GF than the flame retardants used in the comparative tests (Ref.). If only MPP is used as a flame retardant for polyamide then in the best-case scenario the classification is at V-1. A total loading of 22.5% was found to be the best possible variant. If a combination of poly-[DOPAc-2-PETA] and MPP is used a V-0 classification can be achieved as shown above. Even a very small addition of only 1% of poly-[DOPAc-2-PETA] in the composition presents that marked improvement. That result is achieved with otherwise identical total loading with flame retardant. This shows that poly-[DOPAc-2-PETA] can have a synergistic effect in that combination and can thus improve the UL94 classification.

If the concentration of the poly-[DOPAc-2-PETA] component is increased in a flame retardant composition with a total loading of 22.5% in the plastic composition, then the burning times are reduced with an increase in the poly-[DOPAc-2-PETA] proportion. With that flame retardant combination, intumescence is much more greatly pronounced than when using MPP as the sole flame retardant.

In comparative tests with pure Ukanol as the flame retardant the intake suffered agglutination upon extrusion. Whereas, in the processing with thermosets according to the invention as the flame retardants, no additional precautions had to be taken or further safety criteria/aspects had to be fulfilled. Extrusion can be effected with the same settings and temperatures as with the corresponding non-flame retarded polyamide.

The invention claimed is:

1. A thermoset which can be obtained by a method in which in a first step a compound or a mixture of compounds having the general formula I

19

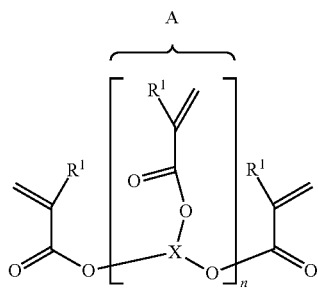

I is reacted with a compound of the general formula II $R^2$—H    II giving a mixture of compounds of the general formula III

III

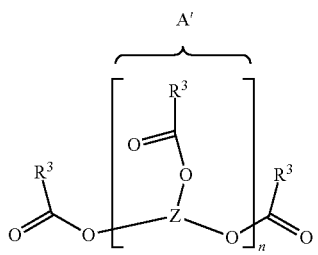

which in a second step is reacted in a radical polymerization operation to give a thermoset, wherein the designations are:

$R^1$ hydrogen, a $C_1$-$C_6$ alkyl, a $C_6$-$C_{12}$ aryl or a $C_6$-$C_{12}$ alkylaryl,

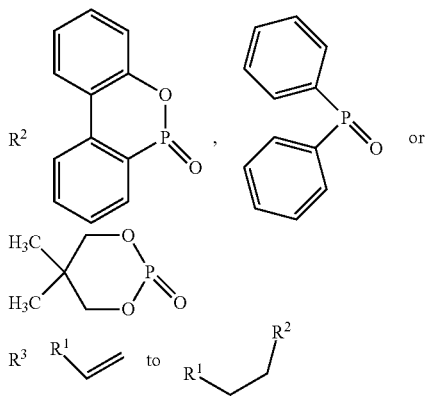

wherein within a compound of formula III and within the sub-unit A' the residues $R^3$ can be the same or different and wherein the compound or the mixture of compounds of formula I is used in a ratio to the compound of formula II so that the ratio of

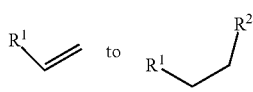

20 in the mixture produced in the first step of compounds III is in the range of between 4:1 and 1:4, and wherein X 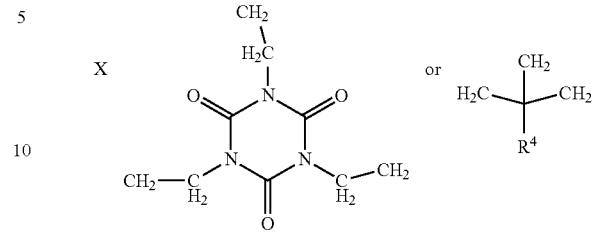

wherein $R^4$ is hydrogen, $CH_2OH$, OH, a $C_1$-$C_6$ alkyl, a $C_6$-$C_{12}$ aryl, a $C_6$-$C_{12}$ alkylaryl or Z 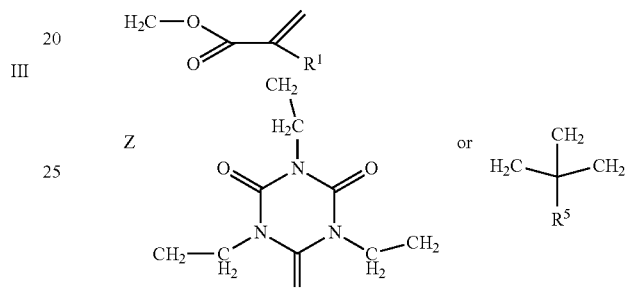

wherein $R^5$ is hydrogen, $CH_2OH$, OH, a $C_1$-$C_6$ alkyl, a $C_6$-$C_{12}$ aryl, a $C_6$-$C_{12}$ alkylaryl or

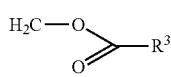

and n in the compound according to formula I or the mixtures of compounds according to formulae I and III represents a mean chain length in the range of between 1 and 100.

2. The thermoset as set forth in claim 1, wherein the molar ratio of the compound of the general formula II to the compound or the mixture of compounds of the general formula I prior to the reaction in the first step is in the range of 1 to 5/E to 1 to 1.25/E, wherein E is the number of groups

in the compound or the mixture of compounds according to formula I.

3. The thermoset as set forth in claim 1, wherein n is in the range of between 1 and 50.

4. The thermoset as set forth in claim 1, wherein compound I is selected from pentaerythritol tetra-acrylate, dipentaerythritol penta-acrylate, dipentaerythritol hexa-acrylate, trimethylolpropane tris-acrylate and tris(2-acryloxyethyl)isocyanurate.

5. The thermoset as set forth in claim 1, wherein the reaction in the first step is effected under catalysis with a catalyst selected from tertiary amines and tertiary amino-bases, preferably triethylamine.

6. The thermoset as set forth in claim 1, wherein the reaction in the second step is effected in an emulsion in toluene or water.

7. The thermoset as set forth in claim 1, wherein the reaction in the second step is effected by means of a radical starter preferably selected from azo-bis-(isobutyronitrile) and dibenzoyl peroxide.

8. A method in which in a first step a compound or a mixture of compounds having the general formula I

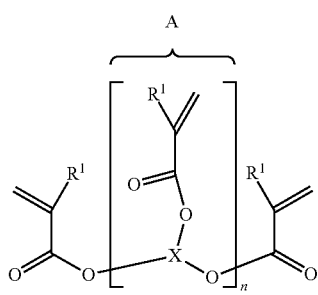

is reacted with a compound of the general formula II

giving a mixture of compounds of the general formula III

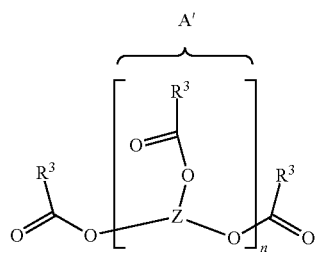

which in a second step is reacted in a radical polymerization operation to give a thermoset, wherein the designations are:

$R^1$ hydrogen, a $C_1$-$C_6$ alkyl, a $C_6$-$C_{12}$ aryl or a $C_6$-$C_{12}$ alkylaryl,

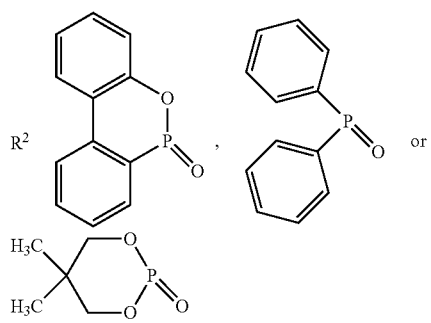

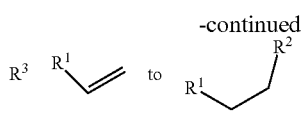

wherein within a compound of formula III and within the sub-unit A' the residues $R^3$ can be the same or different and wherein the compound or the mixture of compounds of formula I is used in a ratio to the compound of formula II so that the ratio of

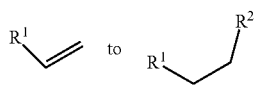

in the mixture produced in the first step of compounds III is in the range of between 4:1 and 1:4, and wherein

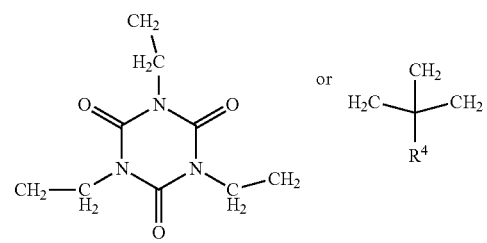

wherein $R^4$ is hydrogen, $CH_2OH$, OH, a $C_1$-$C_6$ alkyl, a $C_6$-$C_{12}$ aryl, a $C_6$-$C_{12}$ alkylaryl or

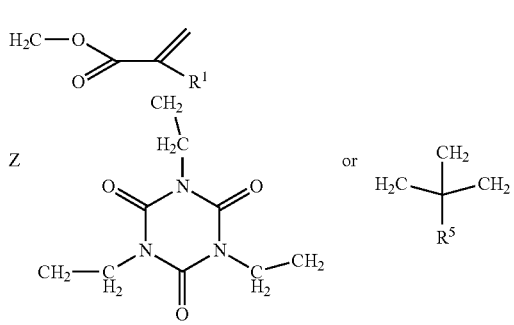

wherein $R^5$ is hydrogen, $CH_2OH$, OH, a $C_1$-$C_6$ alkyl, a $C_6$-$C_{12}$ aryl, a $C_6$-$C_{12}$ alkylaryl or

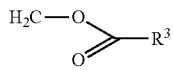

and n in the compound according to formula I or the mixtures of compounds according to formulae I and III represents a mean chain length in the range of between 1 and 100.

9. A flame retardant composition containing a thermoset as set forth in one claim 1.

10. The flame retardant composition as set forth in claim 9 which contains at least one further flame-retardant component selected from nitrogen bases, melamine derivatives, phosphates, pyrophosphates, polyphosphates, organic and inorganic phosphinates, organic and inorganic phosphonates and derivatives of the afore-mentioned compounds, preferably selected from ammonium polyphosphate, ammonium polyphosphate particles coated and/or coated and cross-linked with melamine, melamine resin, melamine derivatives, silanes, siloxanes or polystyrenes, as well as 1,3,5-triazine compounds including melamine, melam, melem, melon, ammeline, ammelide, 2-ureidomelamine, acetoguanamine, benzoguanamine, diamino phenyl triazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-triazine compounds, guanine, piperazine phosphate, piperazine polyphosphate, ethylene diamine phosphate, pentaerythritol, borophosphate, 1,3,5-trihydroxyethyl isocyanurate, 1,3,5-triglycidyl isocyanurate, triallyl isocyanurate and derivatives of the afore-mentioned compounds.

11. The flame retardant composition as set forth in claim 10, wherein the ratio of thermoset to the at least one further flame retardant component in the flame retardant composition is between 1:99 and 99:1.

12. A flame retardant plastic composition comprising the flame retardant composition as set forth in claim 9.

13. The flame retardant plastic composition as set forth in claim 12, wherein the plastic is selected from the group consisting of filled and unfilled polyamides, polyesters and polyolefins.

14. A flame retardant plastic composition containing the thermoset as set forth in claim 1.

15. The flame retardant plastic composition as set forth in claim 12, wherein the flame retardant composition is contained in the flame retardant plastic composition in an amount of between 5 and 60% by weight with respect to the total weight of the flame retardant plastic composition.

16. The flame retardant plastic composition as set forth in claim 14, wherein the thermoset is introduced in an amount of between 1 and 30% by weight with respect to the total weight of the flame retardant plastic composition.

* * * * *